(12) United States Patent
Stone et al.

(10) Patent No.: US 6,721,309 B1
(45) Date of Patent: Apr. 13, 2004

(54) METHOD AND APPARATUS FOR MAINTAINING PACKET ORDER INTEGRITY IN PARALLEL SWITCHING ENGINE

(75) Inventors: Geoffrey C. Stone, Malibu, CA (US); Scot A. Reader, Sherman Oaks, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/314,261

(22) Filed: May 18, 1999

(51) Int. Cl.[7] .............................................. H04L 12/56
(52) U.S. Cl. ........................................ 370/362; 370/364
(58) Field of Search ................................. 370/412, 413, 370/428, 394, 397, 399, 362, 364

(56) References Cited

U.S. PATENT DOCUMENTS

| | | | |
|---|---|---|---|
| 5,020,052 A | | 5/1991 | DePrycker |
| 5,127,001 A | * | 6/1992 | Steagall et al. |
| 5,793,747 A | * | 8/1998 | Kline ............................ 370/230 |
| 5,864,540 A | * | 1/1999 | Bonomi et al. .............. 370/235 |
| 5,889,764 A | * | 3/1999 | Needham et al. ............ 370/263 |
| 6,011,775 A | * | 1/2000 | Bonomi et al. .............. 370/230 |
| 6,092,115 A | * | 7/2000 | Choudhury et al. ......... 709/235 |
| 6,175,554 B1 | * | 1/2001 | Jang et al. .................... 370/229 |

FOREIGN PATENT DOCUMENTS

EP          0 859 492 A  *  8/1998  ............ H04L/12/56

* cited by examiner

Primary Examiner—Kenneth Vanderpuye
(74) Attorney, Agent, or Firm—Michael Blaine Brooks, P.C.; Andrew S. Naglestad; David A. Cordeiro (57) ABSTRACT

A method and apparatus for maintaining packet order integrity in a switching engine wherein inbound packets are forwarded to different ones of parallel processing elements for switching. Order preservation for packets relating to the same conversation is guaranteed by checking for each inbound packet whether a previous packet from the same source is pending at a processing element and, if the check reveals that such a packet is pending, forwarding the inbound packet to the same processing element as the previous packet.

24 Claims, 7 Drawing Sheets

METHOD AND APPARATUS FOR MAINTAINING PACKET ORDER INTEGRITY IN PARALLEL SWITCHING ENGINE

BACKGROUND OF THE INVENTION

The present invention relates to data switching, and more particularly to data switching engines of the kind in which a processor array is used to switch data from a plurality of sources to a plurality of destinations in a data communication network.

In recent years, high-speed data communication switching has been accomplished mostly in application specific integrated circuits (ASICs). Programmable logic devices have generally been considered too slow to be relied upon as main switching engines. With recent improvements in programmable logic technology, however, a trend now appears to be emerging toward implementing multiple programmable logic devices in parallel, or parallel processor arrays, as primary data switching engines.

Processor array switching engines provide certain advantages over ASIC switching engines in terms of time-to-market, flexibility and scalability. Still, the "parallel" aspect of processor array switching engines creates technical challenges. Foremost among these is how to best allocate the resources of the array. One possibility is to strictly dedicate each processor in the array to a particular group of sources. However, such a dedicated processor array is inefficient since a processor is idle whenever the sources to which it is dedicated are not transmitting packets, even while other processors may be overburdened. A second possibility is to allow each processor in the array to be shared by all sources. Such a shared processor array might greatly increase overall switching efficiency, especially when implemented in conjunction with an efficient load balancing algorithm ensuring that inbound packets are transmitted to the processors presently being underutilized. However, a shared processor array gives rise to other problems, such as how to preserve packet order integrity.

A problem of preserving packet order integrity arises in shared processor arrays because at any given time in the operational cycle of such an array, the time required to process a packet will vary from processor-to-processor. Thus, packets may be switched out of the array in an order different from that in which they were transmitted to the array for switching. While a departure from strict "first in, first out" sequencing is not a problem for packets applicable to different conversations, it may be for packets applicable to the same conversation.

Accordingly, there is a need for a way to ensure in a processor array in which the processing elements are shared among all sources that packets from the same source leave the array in the sequence in which they arrived. And there is a need for preserving packet ordering for packets from a common source without imposing too high a tax on switching performance.

SUMMARY OF THE INVENTION

The present invention provides a method and apparatus for preserving packet order integrity in a shared processor array. The order for packets relating to the same conversation is maintained by checking for each inbound packet whether a previous packet from the same source is pending at a processing element before forwarding the packet to the processor array. If the check reveals that such a packet is pending, the inbound packet is forwarded to the same processing element as the previous packet. If the check reveals that no packet from the same source is pending at any processing element, the inbound packet is forwarded to a processing element in accordance with a load balancing algorithm.

The present invention may be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
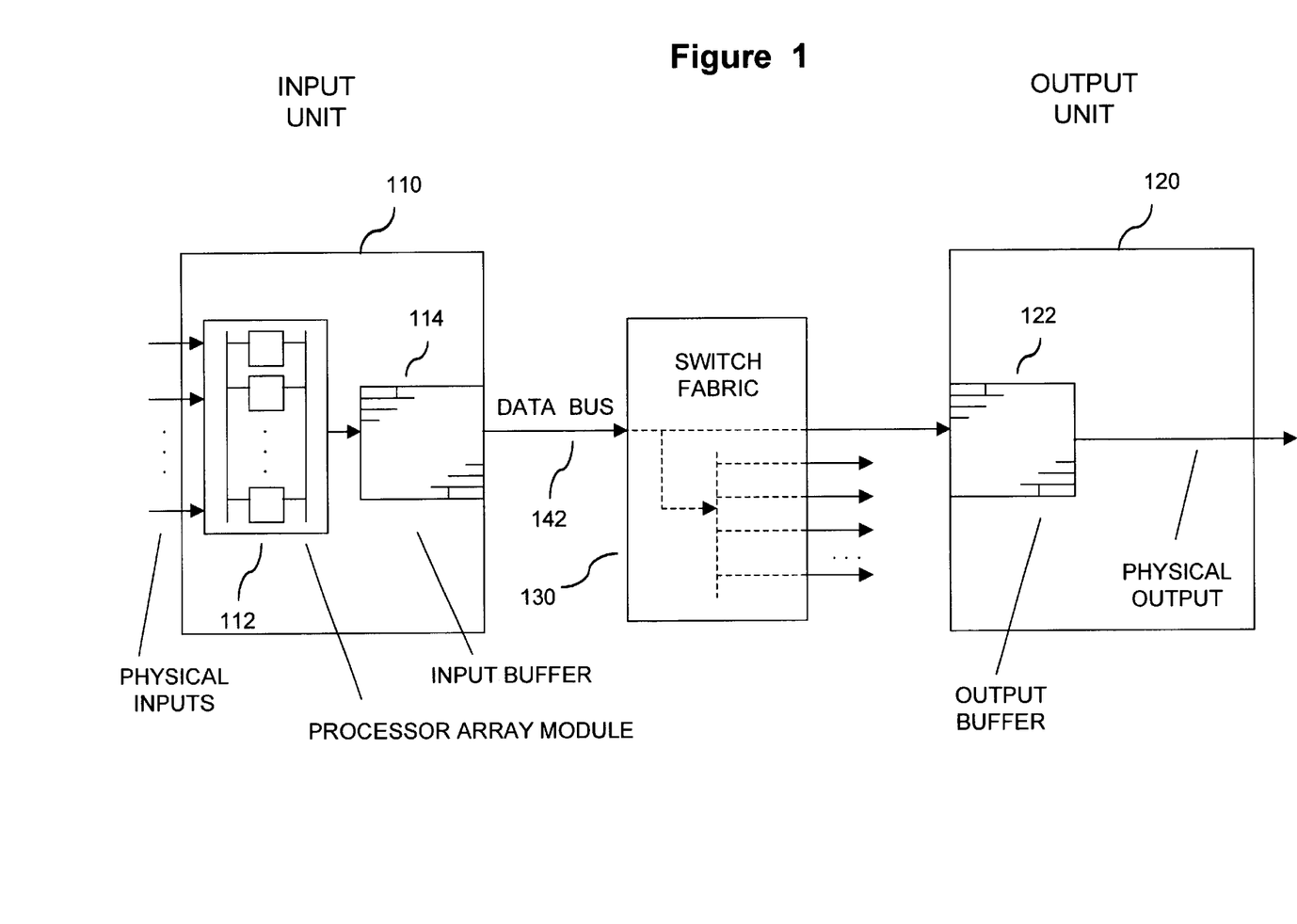
FIG. 1 illustrates a portion of a data communication switching architecture.

In FIG. 1, an input unit 110 and output unit 120 for a data switching architecture are shown. In the complete architecture (not shown), one or more input units and one or more output units are coupled via a switch fabric 130 such that every physical input (and its associated input unit) may transfer data to every physical output (and its associated output unit). At any given instant in time, a subset (or all) of input units receive data destined for a subset (or all) output units. Data may therefore be imagined as flowing from left to right, for example, from input unit 110 to output unit 120. Each input unit has a plurality of physical inputs and each output unit has one or more physical outputs. Data may be transmitted through the architecture in variable length packets, in fixed length cells, or both, although any such discrete unit of data will be referred to as a "packet" herein for clarity and consistency. In a preferred switching operation between input unit 110 and output unit 120, a packet received on one of the physical inputs and destined for the physical output arrives at processor array module 112 and is switched and forwarded to input buffer 114. The packet is eventually released on fabric data bus 142 to switching fabric 130 and arrives at output buffer 122, where the packet remains stored until eventual delivery on the physical output.

Figure 2:
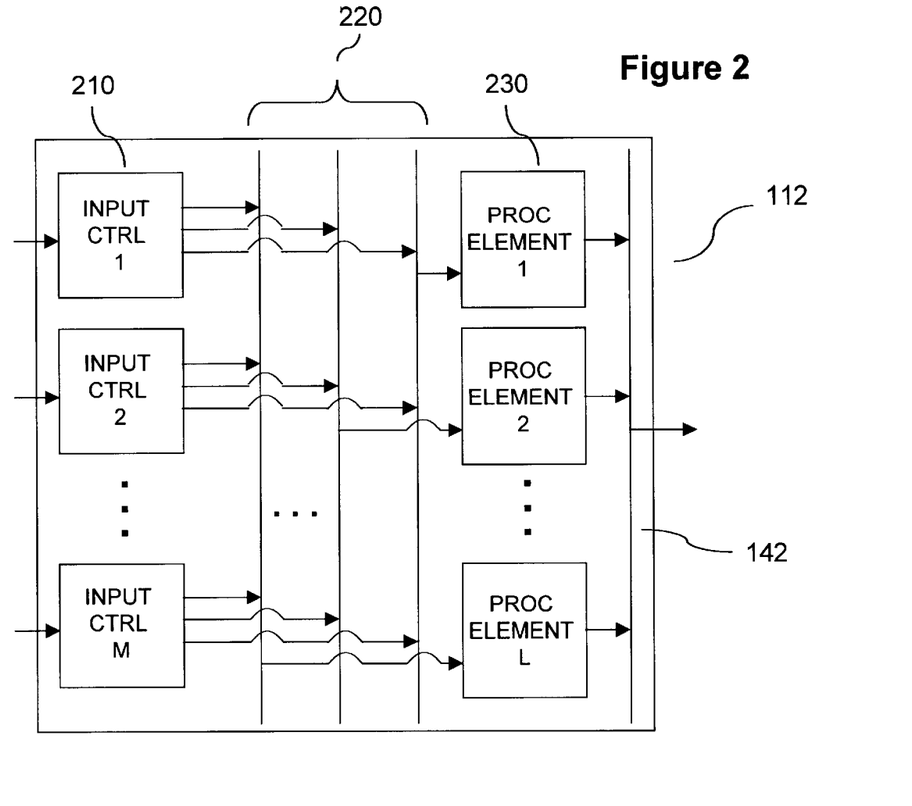
FIG. 2 illustrates the processor array module of FIG. 1 in greater detail.

In FIG. 2, processor array module 112 is shown in greater detail. Processor array module 112 is responsible for switching packets from physical inputs to physical outputs. In its most basic feature, the switching operation performed in module 112 involves interpreting and modifying packet control fields, such addresses encoded in packet headers, to ensure delivery of packets on appropriate physical outputs. Processor array module 112 has M input controllers 210 associated with physical inputs. Input control units 210 are coupled via L module data buses 220 to processor array 230 which includes L processing elements. Module data buses 220 are arranged such that each processing element receives data on a particular bus and each input controller may transmit data on each bus. Processing elements 230 share external data bus 142 for forwarding packets to input buffer 114 after the packet switching operation has been completed.

Figure 3:
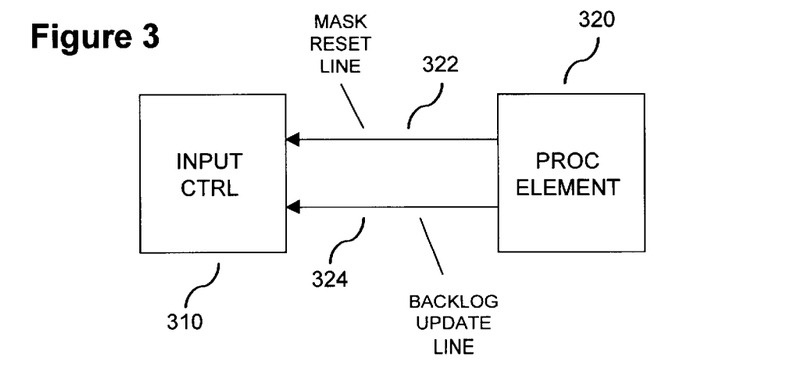
FIG. 3 illustrates the control lines for control flows between an input controller and a processing element of FIG. 2.

An important object of the invention is to implement a shared processor array which preserves the sequence of packets applicable to the same conversation. This preservation of packet order integrity is achieved in a preferred embodiment by implementing a "commit-and-release" protocol. Input controllers 210 deliver packets from different sources to processor array 230. Uncommitted sources become committed to a particular processing element in array 230 upon forwarding an inbound packet from the source to the element. All subsequent inbound packets from the source are forwarded to the element while the commitment is in effect. The commitment is terminated after all packets from the source have been switched out of the array. This "commit-and-release" protocol guarantees that packets applicable to the same conversation are switched out of a shared array processor array in their order of arrival without unduly hindering switching performance. In furtherance of this basic inventive feature, input controllers 210 and processing elements in array 230 are coupled by control lines. Turning to FIG. 3, a representative input controller 310 and processing element 320 are coupled by mask reset line 322 and backlog update line 324. Processing element 320 invokes lines 322, 324 to provide feedback to input controller 310 about current conditions at element 320 which controller 310 must know to correctly decide which processing element within array 230 to select when forwarding inbound packets. Particularly, mask reset line 322 is invoked to instruct controller 310 that element 320 has no more packets pending from the source. This instruction in effect releases the source from a previous commitment to element 320 so that a processing element for the next inbound packet from the source may be selected on the basis of efficiency, rather than selecting element 320 out of concern for preserving packet order. Backlog update line 324 is invoked to inform controller 310 about the current backlog of packets pending in element 320 from sources associated with all input controllers 210. When a source associated with controller 310 is in the uncommitted state, controller 310 compares backlog information provided by all processing elements in array 230 to assess the relative efficiency of forwarding inbound packets from the source to element 320.

Figure 4:
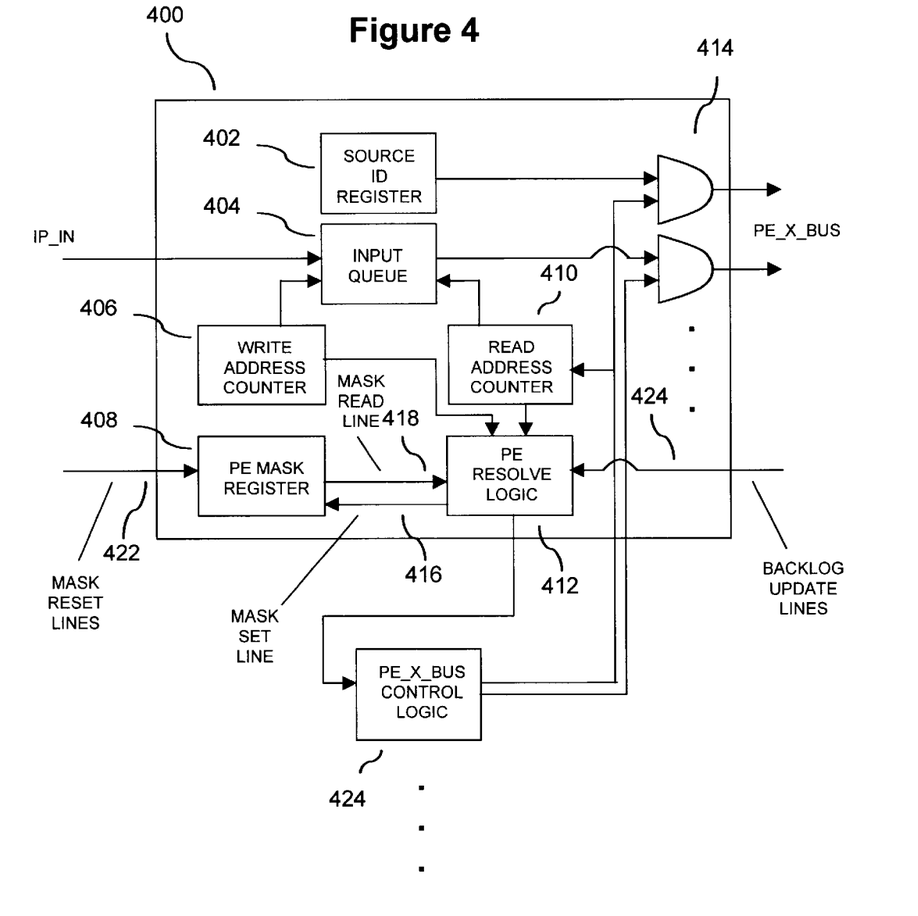
FIG. 4 illustrates an input controller of FIG. 2 in greater detail.

The operation of processor array module 210 will now be described in even more detail by reference to FIGS. 4–10. Referring first to FIG. 4, a representative input controller 400 is illustrated. Inbound packets arrive at controller 400 on physical input IP_IN and are written to input queue 404 and write address counter 406 is incremented. PE resolve logic 412 monitors write address counter 406 and read address counter 410. When an inbound packet is pending in queue 404, PE resolve logic 412 selects a processing element and transmits a packet release request to the to the control logic element PEX_BUS control logic 424 for the module data bus PE_X_BUS on which the selected processing element listens. Eventually, logic 424 grants the request. AND gates 414 are enabled and the inbound packet is read from queue 404 and transmitted along with a source identifier retrieved from source port ID register 402 on the bus PE_X_BUS to the selected processing element. It bears noting that although in the illustrated embodiment controller 400 has only one physical input, in other embodiments the controller may have one or more physical inputs. Moreover, while in the illustrated embodiment all inbound packets arriving at controller 400 on the physical input are attributed to the same source, in other embodiments inbound packets arriving at a controller on a common physical input but having different source addresses may be attributed to different sources.

Figure 5:
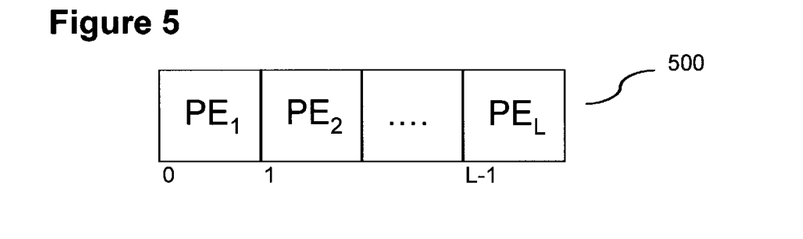
FIG. 5 illustrates the format of a bit mask stored in the PE mask register of FIG. 4.

In order to make a correct processing element selection for an inbound packet, PE resolve logic 412 first determines whether the source for the inbound packet is in the committed or uncommitted state. This determination is assisted by a bit mask retained in PE mask register 408. The format 500 of the mask retained in PE mask register 408 is shown in FIG. 5. Each of the L processing elements active in processor array 230 is assigned a bit position within the mask. The mask is read by PE resolve logic 412 on mask read line 418. If a bit in the bit mask is set, the source is currently committed to the processing element whose bit is set and PE resolve logic 412 selects that processing element. If no bit in the mask is set, however, the source is currently uncommitted and logic 412 may select a processing element on the basis of efficiency. PE resolve logic 412 in that event compares backlog information received from all processing elements on backlog update lines 424 and selects the processing element whose backlog is at present lowest. Of course, other load balancing algorithms are possible in which factors other than current backlog are determinative when selecting a processing element for inbound packets from uncommitted sources.

Sources are switched between the committed and uncommitted state by setting and resetting the mask in PE mask register 408. The mask is set when a processing element for an uncommitted source is selected on the basis of efficiency. Particularly, the bit reserved in the mask for the element is set over mask set line 416. The mask is reset when the previously selected processing element transmits a reset instruction to controller 400 after the last packet pending from the source is switched out of the element. Particularly, the reset instruction is transmitted on one of the mask reset lines 422 driven by the element causing the mask to be reset.

Figure 6:
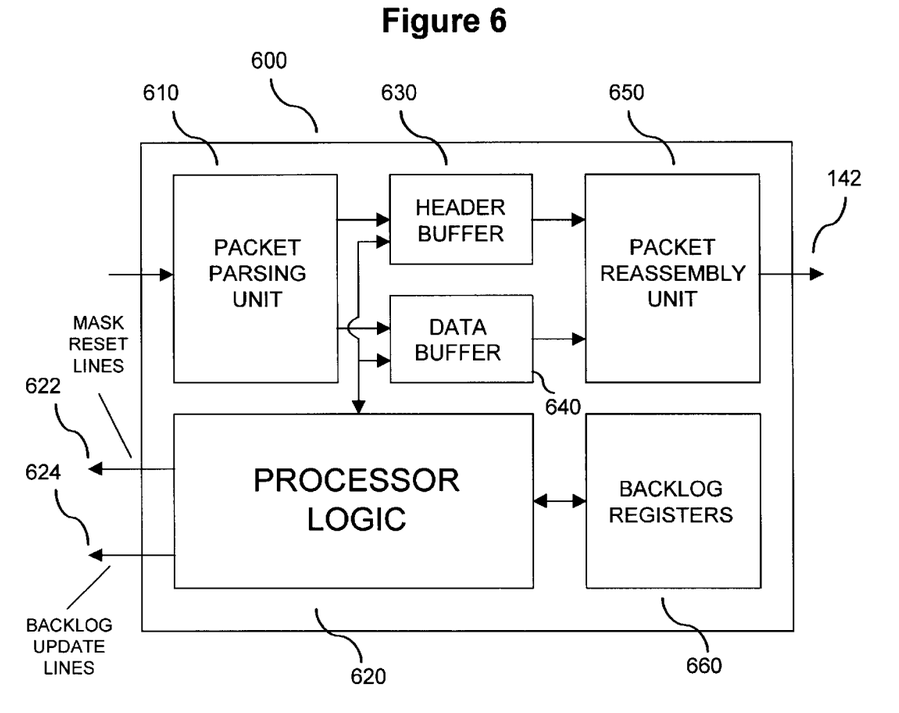
FIG. 6 illustrates a processing element of FIG. 2 in greater detail.

Referring now to FIG. 6, a representative processing element 600 is illustrated in more detail. Packets (including the source identifier) arrive off a module bus (e.g., PE_X_BUS) at element 600 and are written into packet parsing unit 610. Parsing unit 610 strips off the packet header (including the source identifier) and deposits the inbound header in header buffer 630. The packet payload flows to data buffer 640. Processor logic 620 reviews the inbound header and converts the inbound header into an outbound header sufficient to ensure delivery of packets on appropriate physical outputs. The outbound header and payload for the packet are eventually released to packet reassembly unit 650 where the outbound header is reassembled with the payload and the reassembled packet is released on external data bus 142.

Figure 7:
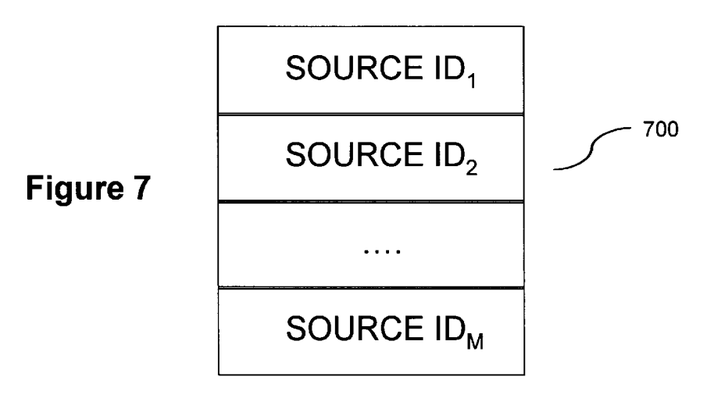
FIG. 7 illustrates the format of backlog registers of FIG. 6 in greater detail.

Processing element 600 monitors the backlog of packets pending at element 600 from each source through the expedient of backlog registers 700. The form of backlog registers 700 is shown in FIG. 7. A backlog register is assigned to each of the M sources active in processor array module 210. Each register retains a backlog count reflecting the current number of packets pending at element 600 from a particular source. For every packet from a particular source which arrives at element 600, processor logic 620 increments the backlog count in the register reserved for the source. For every packet from a particular source which is released by element 600, processor logic decrements the backlog count in the register reserved for the source. If a backlog count in a register is decremented from one to zero, element 600 transmits a reset instruction to the input controller associated with the source whose backlog value reverted to zero on the appropriate one of mask reset lines 622 to release the source from its commitment to element 600. Element 600 also invokes backlog update line 624 on a regular basis to inform all input controllers of the current aggregate (i.e., all source) backlog count at element 600, in order to provide uncommitted sources an updated view of the relative backlog at the elements when selecting elements for inbound packets on the basis of efficiency.

Figure 8:
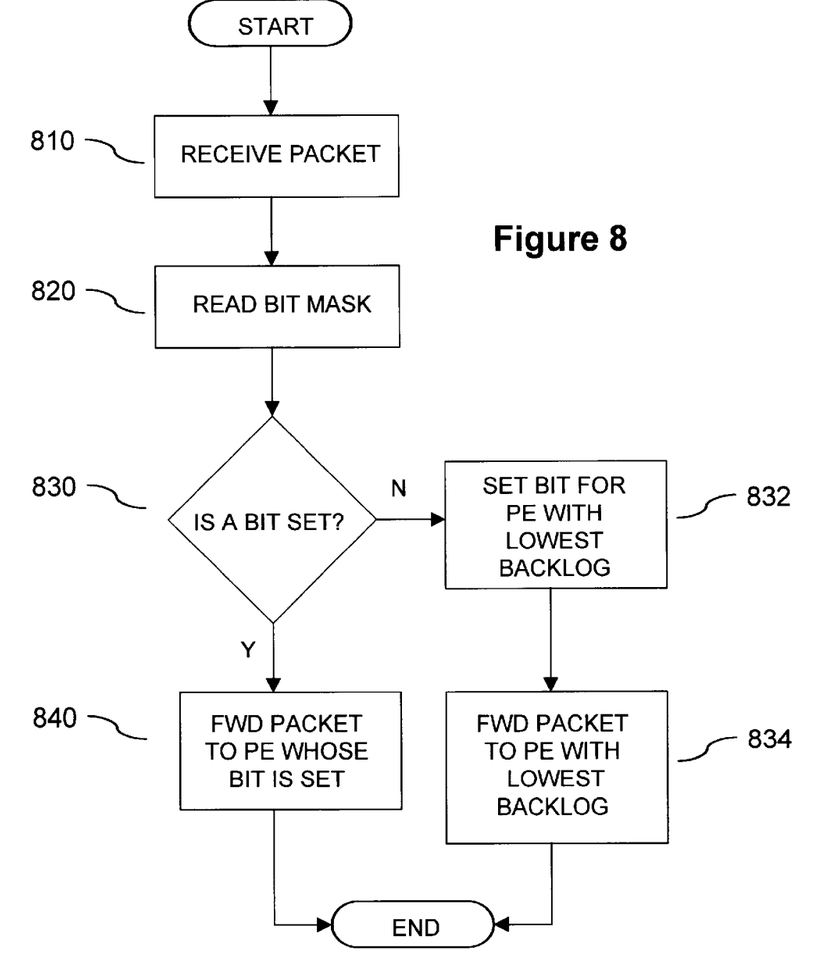
FIG. 8 is a flow diagram illustrating a check performed at an input controller of FIG. 2 before forwarding a packet to a processing element.

Turning now to FIG. 8, a flow diagram illustrates a check performed at an input controller of FIG. 2 before forwarding an inbound packet to a processing element. The packet is received at the input controller on a physical input (810) and the bit mask is read (820). A determination is made whether a bit in the mask is set (830). If a bit in the mask is set, the source is presently committed and the packet is forwarded to the processing element whose bit is set to obviate any packet ordering problem (840). If, however, no bit in the mask is set, the source is not presently committed. Accordingly, backlog information for the processing elements is referenced and the packet is forwarded to the processing element having the lowest backlog (834). Prior to such forwarding, however, the bit in the mask reserved for the selected processing element is set to commit the source to that element (832).

Figure 9:
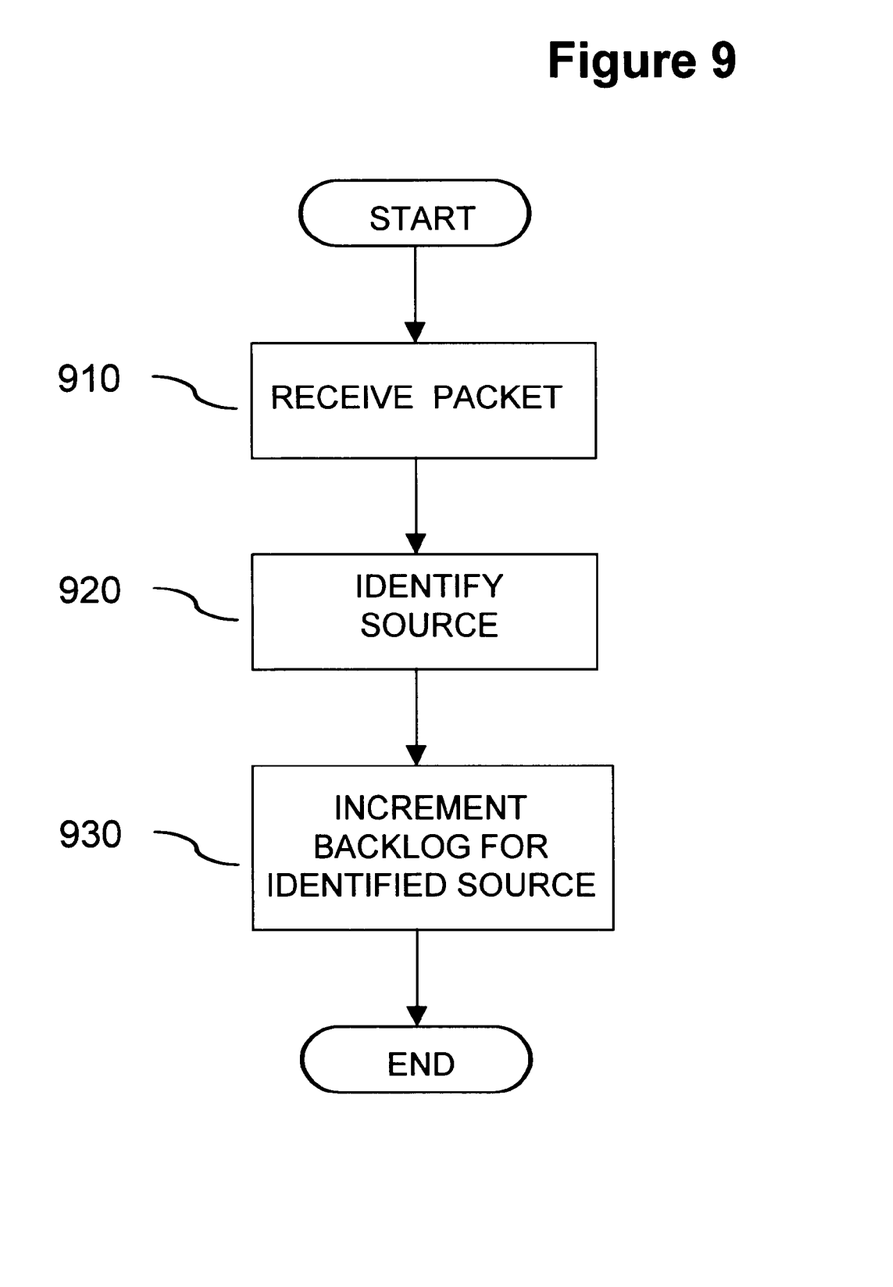
FIG. 9 is a flow diagram illustrating a packet backlog update function performed at a processing element of FIG. 2.

Referring to FIG. 9, a flow diagram illustrates a packet backlog update function performed at a processing element of FIG. 2. The packet is received at a processing element from a module data bus (910). The source is identified (920) and the backlog count for the identified source is incremented (930).

Figure 10:
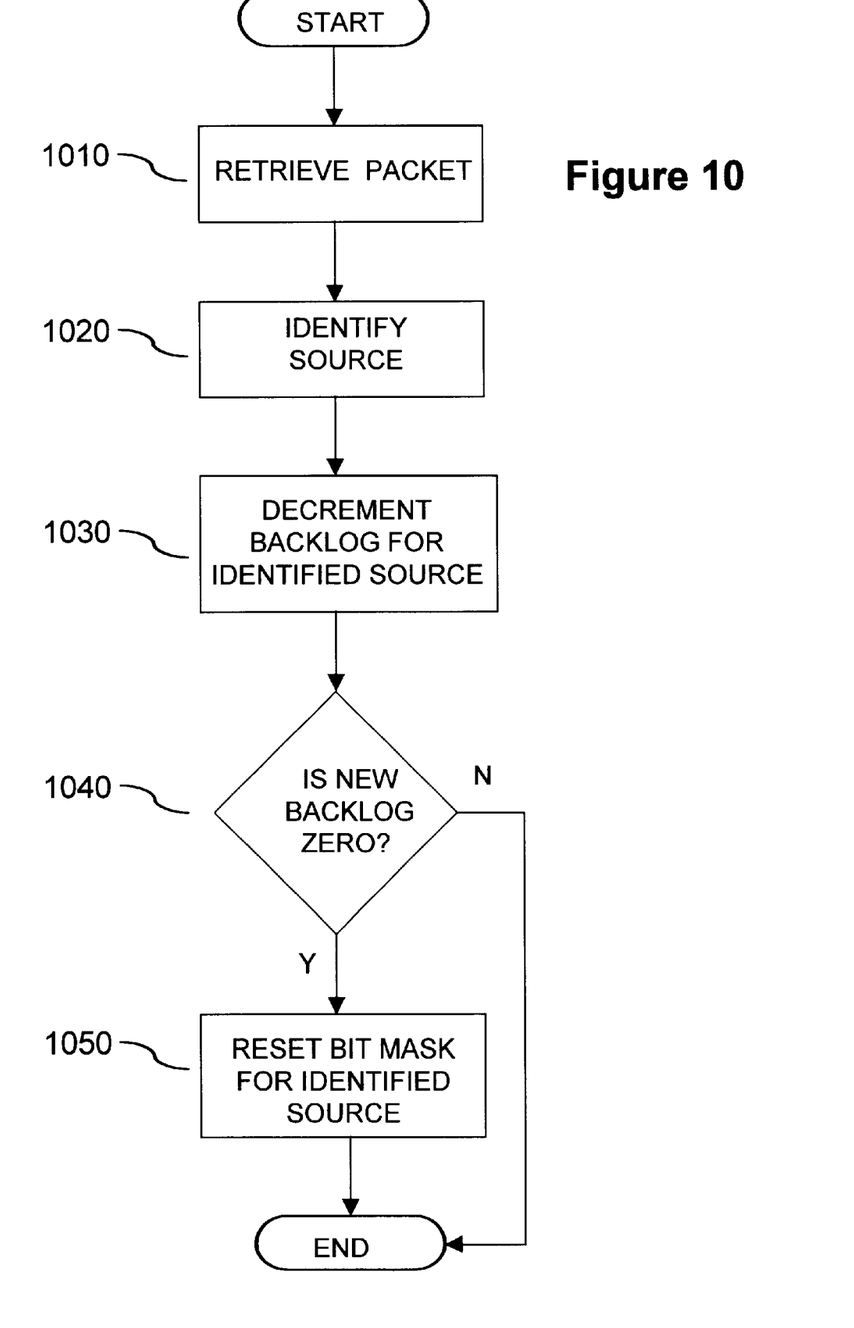
FIG. 10 is a flow diagram illustrating a packet backlog update and bit mask reset function performed at processing element of FIG. 2.

Referring finally to FIG. 10, a flow diagram illustrates a packet backlog update and bit mask reset function performed at a processing element of FIG. 2. The packet is retrieved from a buffer (1010) and the source is identified (1020). The backlog count for the identified source is decremented (1030). A check is made to determine if the new backlog count is zero (1040). If the new backlog count is zero, the bit mask for the identified source is reset (1050).

It will be appreciated by those of ordinary skill in the art that the invention can be embodied in other specific forms without departing from the spirit or essential character hereof. The described embodiment is therefore in all respects considered illustrative and not restrictive. The scope of the invention is defined by the appended claims, and all changes that come within the range of equivalents thereof are intended to be embraced therein.

We claim:

1. A method for preserving packet order integrity in a switching engine wherein packets are forwarded to different ones of a plurality of processing elements within a processor array for switching, comprising checking for each inbound packet whether another packet from the same source is pending at an individual processing element before forwarding the inbound packet to the individual processing element.

2. A method for preserving packet order integrity in a switching engine wherein packets are forwarded to different ones of a plurality of parallel processing elements for switching, comprising:
   checking for an inbound packet whether another packet from the same source is pending at any processing element; and
   if another packet from the same source is pending at any processing element, forwarding the inbound packet to the processing element at which the other packet from the same source is pending.

3. The method according to claim 2, further comprising:
   if no other packet from the same source is pending at any processing element, forwarding the inbound packet to a processing element selected in accordance with a predetermined algorithm.

4. The method according to claim 2, further comprising:
   if no other packet from the same source is pending at any processing element, forwarding the inbound packet to a processing element selected in accordance with a predetermined load balancing algorithm.

5. The method according to claim 2, further comprising:
   if no other packet from the same source is pending at any processing element, forwarding the inbound packet to a processing element having the lowest backlog of packets.

6. A method for preserving packet order integrity in a switching engine wherein packets are forwarded to different ones of a plurality of processing elements within a processor array for switching, comprising checking for each inbound packet whether a source of the packet is committed to a processing element within the processor array before forwarding the inbound packet to the processor array.

7. A method for preserving packet order integrity in a switching engine wherein packets are forwarded to different ones of a plurality of processing elements within a processor array for switching, comprising:
   determining if a source of an inbound packet is committed to any processing element; and
   if the source of the inbound packet is committed to any processing element, forwarding the inbound packet to the processing element to which the source is committed.

8. The method according to claim 7, further comprising:
   if the source of the inbound packet is not committed to any processing element, forwarding the inbound packet to a processing element selected in accordance with a predetermined algorithm.

9. The method according to claim 7, further comprising:
   if the source of the inbound packet is not committed to any processing element, forwarding the inbound packet to a processing element selected in accordance with a predetermined load balancing algorithm.

10. The method according to claim 7, further comprising:
    if the source of the inbound packet is not committed to any processing element, forwarding the inbound packet to a processing element having the lowest backlog of packets.

11. In a switching engine wherein packets from different sources are forwarded to different ones of a plurality of parallel processing elements for switching, a method for preserving packet order integrity, comprising:
    committing a source to processing element; and
    forwarding inbound packets from the source to the processing element and no other processing element until the commitment is released 12. The method according to claim 11, wherein the commitment is released when all the inbound packets from the source have been switched from the processing element.

13. A switching engine to switch packets from a plurality of sources comprising:
- a processor array to switch the packets and provide them as output, the processor array including a plurality of parallel processing elements; and
- a plurality of input controllers to receive the packets from the plurality of sources and to provide the received packets to the processor array,
- wherein the input controller, after receiving a packet, determines whether another packet from the same source is pending within the processor array before forwarding the packet to the processor array,
- wherein the processor array provides packets from each of the plurality of sources as output in the order they are received as to preserve packet order integrity of the packets from the same source.

14. The switching engine of claim 13 wherein each input controller, after receiving a packet, determines whether another packet from the same source is pending at any of the parallel processing elements, and wherein the input controller, if another packet from the same source is pending at one of the parallel processing elements, forwards the packet to that processing element.

15. The switching engine of claim 14 wherein the input controller, if no other packet from the same source is pending at any of the parallel processing elements, forwards the packet to one of the parallel processing elements selected in accordance with a predetermined algorithm.

16. The switching engine of claim 14 wherein the input controller, if no other packet from the same source is pending at any of the parallel processing elements, forwards the packet to one of the parallel processing elements selected in accordance with a predetermined load balancing algorithm.

17. The switching engine of claim 14 wherein the input controller, if no other packet from the same source is pending at any of the parallel processing elements, forwards the packet to the processing element having the lowest backlog of packets.

18. The switching engine of claim 13 wherein each input controller, after receiving a packet, determines whether the source providing the packet is committed to any of the parallel processing elements before providing the packet to the processor array.

19. The switching engine of claim 18 wherein each input controller, if the source providing the packet is committed to one of the parallel processing elements, provides the packet to that processing element.

20. The switching engine of claim 18 wherein each input controller, if the source providing the packet is not committed to any of the parallel processing elements, provides the packet to a processing element selected in accordance with a predetermined algorithm.

21. The switching engine of claim 18 wherein each input controller, if the source providing the packet is not committed to any of the parallel processing elements, provides the packet to a processing element selected in accordance with a predetermined load balancing algorithm.

22. The switching engine of claim 18 wherein each input controller, if the source providing the packet is not committed to any of the parallel processing elements, provides the packet to a processing element having the lowest backlog of packets.

23. The switching engine of claim 13 wherein the packets from different sources are forwarded to different ones of the plurality of parallel processing elements, and wherein at least one source is committed to a processing element and the packets from the committed source are provided to the processing element and no other processing element until the commitment is released.

24. The switching engine of claim 23 wherein the commitment is released when all the packets from the committed source have been switched from the processing element.

* * * * *